Aug. 27, 1963  I. E. BRYANT  3,101,551
INSTRUMENT FOR MEASURING LINEAR DIMENSIONS
Filed April 10, 1961
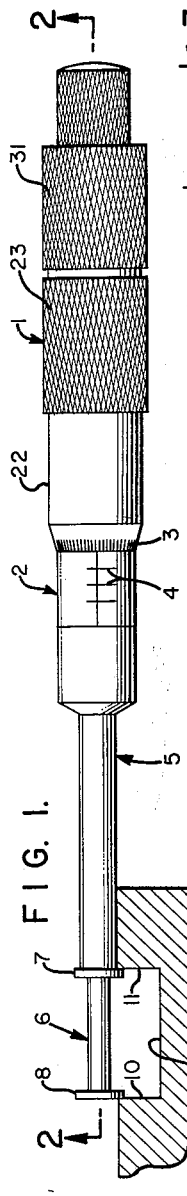
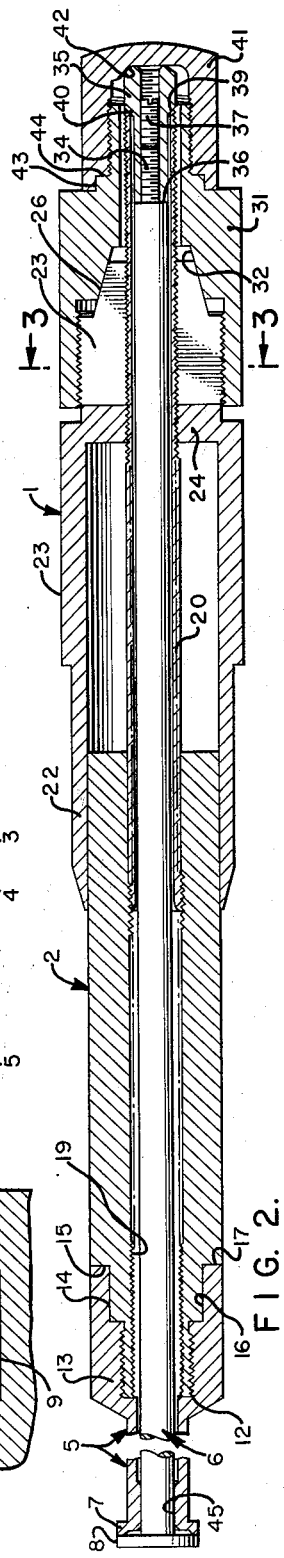
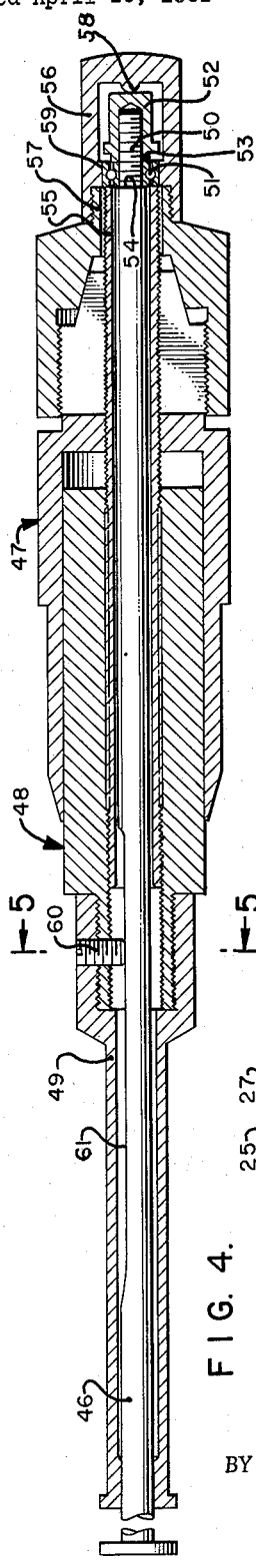
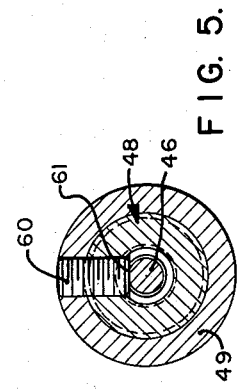
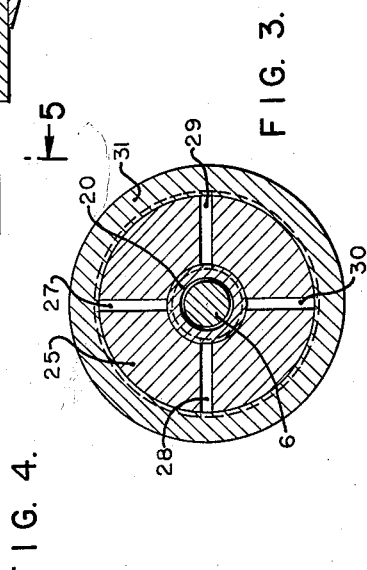
INVENTOR.
IRVIN E. BRYANT
BY
ATTORNEY

United States Patent Office 3,101,551
Patented Aug. 27, 1963

3,101,551
INSTRUMENT FOR MEASURING LINEAR DIMENSIONS
Irvin E. Bryant, Hawthorne, Calif., assignor to The Lufkin Rule Company, Saginaw, Mich., a corporation of Michigan
Filed Apr. 10, 1961, Ser. No. 101,780
8 Claims. (Cl. 33—164)

This invention provides an arrangement for measuring linear dimensions particularly adapted for determining the distances between internal grooves or shoulders within an aperture.

In any machining operations it is necessary to measure the distance between shoulders or the width of grooves formed on the surface of a bore in a part. In the past these measurements generally have been obtained by makeshift and inaccurate means. One common procedure has been to use a probe which has a projection at one end which is inserted into the part. Reference marks are there inscribed on the probe to indicate the axial dimension in question. The distance between the reference marks is then measured with a scale after the probe is removed from the piece. It can be readily appreciated that this is a time consuming and unreliable means of determining the axial distances between hidden shoulders or recesses.

The arrangement of the present invention provides an accurate means of obtaining internal dimensions and is especially useful in connection with measurements to be taken within small bores. This is accomplished through the provision of a thimble and sleeve assembly including a spindle driven axially by the thimble and provided with an outwardly projecting flange at its distal end. In addition, a spool is connected to the end of the sleeve, likewise being formed with an outwardly projecting flange. These flanges are used as feeler elements in measuring the dimensions found within openings, and the spool and spindle units may be of relatively small diameter to fit within narrow openings. The spindle is accurately positioned and supported by the spool and spindle, and may turn with the spindle or be made nonrotatable.

Accordingly, it is an object of this invention to provide an accurate means for measuring linear dimensions.

Another object of this invention is to provide an arrangement which will measure grooves or shoulders formed within an opening.

An additional object of this invention is to provide a low cost, simply designed, micrometer-type measuring device.

A further object of this invention is to provide a measuring unit which will obtain readings within apertures of small diameter.

Yet another object of this invention is to provide a measuring unit having an accurately supported axially movable spindle.

These and other objects will become apparent from the following detained description taken in connection with the accompanying drawing in which:

FIG. 1 is a top plan view of the measuring device of this invention associated with a part to be measured, FIG. 2 is an enlarged longitudinal sectional view taken along line 2—2 of FIG. 1, FIG. 3 is an enlarged transverse sectional view taken along line 3—3 of FIG. 2 illustrating the manner in which the thimble is locked to the internal threaded tube, FIG. 4 is a longitudinal sectional view, partially in elevation, of a modified form of the invention in which the spindle does not rotate, and FIG. 5 is a transverse sectional view taken along line 5—5 of FIG. 4 showing the provision for precluding rotation of the spindle.

With reference to FIGS. 1, 2 and 3 of the drawing, the measuring device of this invention includes a rotatable thimble assembly 1 and a sleeve 2, as in certain conventional micrometer units. Indicator markings 3 are included on the forward beveled end surface of the thimble assembly, and are used in conjunction with circumferentially arranged indicator markings 4 on the sleeve to determine the relative axial position of the thimble and sleeve.

Unlike conventional units, however, the present design includes a spool 5 in the form of a tubular element projecting from the forward end of the sleeve 2. Spindle 6 extends inwardly through the spool. Discs 7 and 8 are formed on, or attached to, the ends of the spool and spindle respectively. These accurately dimensioned radial elements provide feeler elements that are utilized in measuring a dimension such as the width of groove 9 in FIG. 1. Other forms of feelers could be used if desired rather than the discs as illustrated. By projecting radially beyond the periphery of the spindle and the spool, these discs can enter the groove and engage its opposite side walls 10 and 11 so that a reading can be obtained through the markings 3 and 4. The widths of discs 7 and 8 are held to close tolerances so that these members may be used as shown in FIG. 1, or may indicate distances between shoulders or other elements by engaging desired surfaces of such parts. Obviously, it may be necessary to add the width of one or more discs 7 and 8 to the reading on the scale of the micrometer, depending upon the manner in which the instrument is used. In the arrangement of FIG. 1, if the micrometer scale reads zero when the flanges 7 and 8 are in contact, the width of groove 9 will be the scale reading plus the widths of the two discs. If the adjacent faces of discs 7 and 8 are used in engaging an element to be measured, no addition will be necessary and a direct reading will be secured.

The internal construction of the measuring device of this invention may best be seen by reference to FIGS. 2 and 3. The sleeve 2 includes an exteriorly threaded end portion 12 which threadably engages a corresponding receptacle portion 13 of the spool. An accurately held circumferential surface 14 and radial shoulder 15 of the sleeve are thereby brought into engagement with corresponding surfaces 16 and 17 of the spool which serves to accurately position the spool with respect to the sleeve. These surfaces assure that the spool is concentric with the sleeve and that the end flange 7 projects in a precisely radial relationship with respect to the sleeve.

The bore 19 of sleeve 2 is threaded to receive exteriorly threaded tubular member 20. The latter member forms a portion of the thimble assembly so that as the thimble unit is rotated, tubular member 20 causes the thimble assembly to move axially with respect to the housing formed by sleeve 2 and spool 5. Adjacent the forward section 22 of the thimble assembly is a knurled portion 23 to facilitate rotation, provided with an inwardly extending wall 24 that includes an axial tapped opening which threadably engages tube 20. Adjacent the wall 24 is an exteriorly threaded section 25, having a frustoconical surface 26, as well as being provided with four radial slots 27, 28, 29 and 30.

The rear section 31 of the thimble unit threads onto portion 25 at its forward end and includes a frustoconical surface 32 that engages surface 26. Therefore, when the rearward portion 31 is threaded onto portion 25 of the forward section, the reaction of the interengaging frustoconical surfaces, together with the split construction of section 25, causes the latter section to grip the tubular member 20. As a result, all of the parts of the thimble assembly rotate together as one piece including such rotation of the tubular section 20.

The spindle 6 is an elongated member that extends through the bore of members 2 and 5 without contacting it, and passes through the interior of tubular member 20, spaced also from the wall of this member. The rearward end 34 of the spindle is of reduced diameter and exteriorly threaded for receiving a locator nut 35. This nut seats at spindle shoulder 36 where the spindle diameter is reduced. An internal set screw 37 is received within the interior of the locator nut 35 and brought into engagement with the end of portion 34 of the spindle so as to lock the spindle against rotation relative to nut member 35.

The inner end of the tubular member 20 includes an accurately formed frustoconical surface 39 which is engaged by a corresponding frustoconical surface 40 on the locator nut 35. This interengagement of the surfaces 39 and 40 supports the rearward portion of the spindle and aligns the spindle precisely at the axis of the thimble and sleeve.

A cap 41 threads onto the end of rear portion 31 of the thimble assembly, covering the end of this unit. This cap includes a chamfered surface 42 engaging a corresponding end surface of nut 35, so that when the cap is tightened against the nut it will remove back lash from the system. Surfaces 43 and 44 serve to align and position the cap with respect to the thimble assembly.

The opposite end of the spindle is supported by the spool 5 at its outer end portion 45 which is given a smaller internal diameter to serve as such a bearing means for the spindle. Thus, the spindle is held with great accuracy at its forward and rearward portions, and at no other point is engaged with either the thimble or the sleeve portions of the unit.

As a result of the construction described above, readings of great accuracy can be obtained. The spool is maintained concentric and radially positioned by the surfaces 14 and 15 of the sleeve, while the spindle likewise is located exactly at the axis of the unit by reason of the front bearing support 45 and the locator nut 35 engaging the end of the tubular element 20 at its frustoconical surface 39. Therefore, the measuring feeler elements 7 and 8 are both concentric and extend in a true radial direction so that virtually a perfect measurement can be secured.

In the modified form of FIGS. 4 and 5 the spindle 46 is arranged so that it will not rotate. The thimble assembly 47 of this embodiment of this invention, as well as the sleeve 48 and spool 49, may be substantially the same as in the previously described embodiment. The inner end 50 of spindle 46, however, extends through the inner race of a small antifriction bearing 51 and is threadably engaged by a cap nut 52. This nut includes an inner portion 53 that engages the side of the inner race of the bearing 51. This serves to clamp the inner race between the nut 52 and the shoulder 53 of the spindle.

The outer race of bearing 51 engages the end of tubular member 55, which corresponds with the threaded tubular element 20 of the previously described embodiment. In addition, a cap member 56 is threadably connected to the end portion 57 of the thimble assembly, tightened down to bring a small axial projection 58 into engagement with the outer end of the nut 52. An annular portion 59 of reduced diameter of the cap 56 engages and receives the circumferential surface of the outer race of bearing 51, thereby providing a proper support for this bearing.

It is apparent from the foregoing, therefore, that when the spindle assembly is rotated the outer race of bearing 51 will turn with it, but the inner race may remain stationary. Therefore, it is not necessary to rotate the spindle in order to rotate the spindle assembly for advancing the spindle.

Any tendency of the spindle to turn, arising from the frictional contact between the inner and outer races of bearing 51 and the projection 58 of the cap 56 on the end of the nut 52, is prevented by a screw or pin 60 that extends inwardly through the spool portion of the unit with its inner end adjacent an axially extending flattened portion 61 formed on a part of the spindle exterior wall. The radial inward projection of member 60 adjacent this flat surface assures that the spindle 46 cannot turn, yet permits its free axial movement.

The versions of FIGS. 4 and 5, therefore, give a measuring device that again is of great accuracy, yet in which neither of the feeler elements on the ends of the outer measuring sections of the spindle and spool will be caused to rotate. Such a unit is desirable in many instances where relative rotation between the measuring instrument and the part can cause damage to the part.

The foregoing detailed description is to be clearly understood as given by way of illustration and example only, the spirit and scope of this invention being limited solely by the appended claims.

I claim:

1. A device for measuring linear dimensions comprising a housing, said housing having a bore therethrough and an outwardly projecting feeler element at one end thereof; a spindle extending into said bore, said spindle having an outwardly projecting feeler element at the outer end thereof; and a thimble assembly for axially moving said spindle, said thimble assembly including an axially arranged exteriorly threaded tubular element one end of which is threadably received in said bore in said housing, the inner end portion of said spindle being received in said tubular element, the other end of said tubular element having a frustoconical end surface, and nut means threadably engaging the inner end of said spindle, said nut means having a frustoconical surface complementarily engaging said frustoconical surface of said tubular member for thereby aligning said spindle with respect to said tubular member.

2. A device as recited in claim 1 in which said housing is in two sections, including an outer section that includes said feeler element and an inner section, said inner section having a threaded portion, a cylindrical portion adjacent said threaded portion, and a radial shoulder adjacent said cylindrical portion, said outer portion of said housing having corresponding portions complementarily engaging said threaded, cylindrical and radial portions of said inner portion of said housing, thereby joining and aligning said portions of said housing.

3. A measuring device comprising a tubular housing, one end of said housing having an outwardly projecting feeler element thereon; a spindle extending through said housing, one end of said spindle having an outwardly projecting feeler element thereon; an exteriorly threaded tube one end of which is received within and threadably engages said bore in said housing, the opposite end of said tube having a frustoconical surface, the opposite end of said spindle having an axially projecting threaded shank of reduced diameter; a nut threadably receiving said threaded shank, said nut having a frustoconical surface complementarily engaging said frustoconical surface of said end of said tube for thereby positioning said opposite end of said spindle, and whereby rotation of said tube causes axial movement of said spindle, said one end of said housing having a bearing portion extending inwardly for engaging and positioning said one end of said spindle.

4. A measuring device comprising a cylindrical tubular housing having an axial bore therethrough, the outer end of said housing having an outwardly projecting feeler element thereon, and an inwardly projecting bearing portion adjacent said feeler element; a spindle, said spindle having an outwardly projecting feeler element at one end, and a rod portion extending through said bore of said housing in engagement with said bearing portion of said bore and in spaced relationship with remaining portions of said bore; an exteriorly threaded cylindrical tubular member one end of which is threadably received within the opposite end of said bore, said rod extending into said tubular member in spaced relationship therewith, said rod having an end portion of reduced diameter having a threaded exterior; a nut member threadably engaging said end portion of said rod, said nut member and said tubular threaded member having complementary interengaging surfaces for supporting and aligning the said opposite end of said rod; and drive means for said tubular member for causing rotation thereof relative to said housing for thereby axially moving said spindle with respect to said housing.

5. A measuring instrument comprising a tubular housing member having an axial cylindrical bore therethrough, the outer end of said housing having an outwardly projecting feeler member thereon; a spindle extending through said bore in said housing, said spindle having an outwardly projecting feeler element at one end thereof, the opposite end of said spindle including a radial shoulder and an axial projection of reduced diameter; an antifriction bearing the inner race of which engages and supports said axial projection and engages said shoulder; a nut threadably engaging said axial projection and engaging said inner race of said bearing; and rotatable means engaging and supporting the outer race of said bearing, said rotatable means including a portion threadably engaging said bore of said housing and drivingly engaging said nut whereby rotation of said rotatable means causes axial movement of said spindle.

6. A measuring device comprising a tubular housing having an axially disposed cylindrical bore therein, said housing having an outwardly projecting feeler element at one end thereof; a spindle, said spindle having an outwardly projecting feeler element at one end thereof, the other end of said spindle extending inwardly through said bore of said housing, said spindle having a shoulder at said other end portion thereof, and an axial projection of reduced diameter extending from said shoulder; an antifriction bearing the inner race of which engages said shoulder and said projection of said spindle; a nut member threadably engaging said projection and engaging said inner race of said bearing, an exteriorly threaded cylindrical tubular member one end of which is threadably received in the opposite end portion of said bore of said housing, the opposite end of said tubular member engaging the outer race of said bearing; drive means, said drive means including a cap member extending over said bearing, said cap member having an annular surface engaging the circumferential periphery of said outer race of said bearing, and having an axial projection engaging the end of said nut member, said drive means being connected with said tubular member whereby rotation of said drive member causes axial movement of said spindle relative to said tubular housing; and means for precluding rotation of said spindle upon rotation of said drive means.

7. A device as recited in claim 6 in which said means for preventing rotation of said spindle comprises inwardly projecting pin means extending into said bore in said housing, said spindle having an axially extending flattened surface adjacent the inner end of said pin means whereby said pin means precludes rotation of said spindle.

8. A device for measuring linear dimensions comprising a housing, said housing having a bore therethrough and an outwardly projecting feeler element at one end thereof; a spindle extending into said bore, said spindle having an outwardly projecting feeler element at the outer end thereof; means for supporting and aligning the inner end of said spindle comprising axially disposed nut and sleeve means receiving the inner end of said spindle; the nut and sleeve means including a sleeve received in said bore in said housing and a nut engaging said sleeve, the nut and sleeve having interengaging, complementary, smooth frustoconical surfaces, and drive means including a thimble connected to said spindle for advancing said spindle axially relative to said housing and moving said feelers relatively to various measuring positions upon rotation of said thimble; there being axially spaced graduations on said housing and circumferentially spaced graduations on said thimble.

References Cited in the file of this patent

UNITED STATES PATENTS

| 620,337 | Lavigne | Feb. 28, 1899 |
| 799,533 | Clark | Sept. 12, 1905 |
| 2,828,546 | Campbell | Apr. 1, 1958 |

FOREIGN PATENTS

| 738,779 | France | Oct. 18, 1932 |